UNITED STATES PATENT OFFICE.

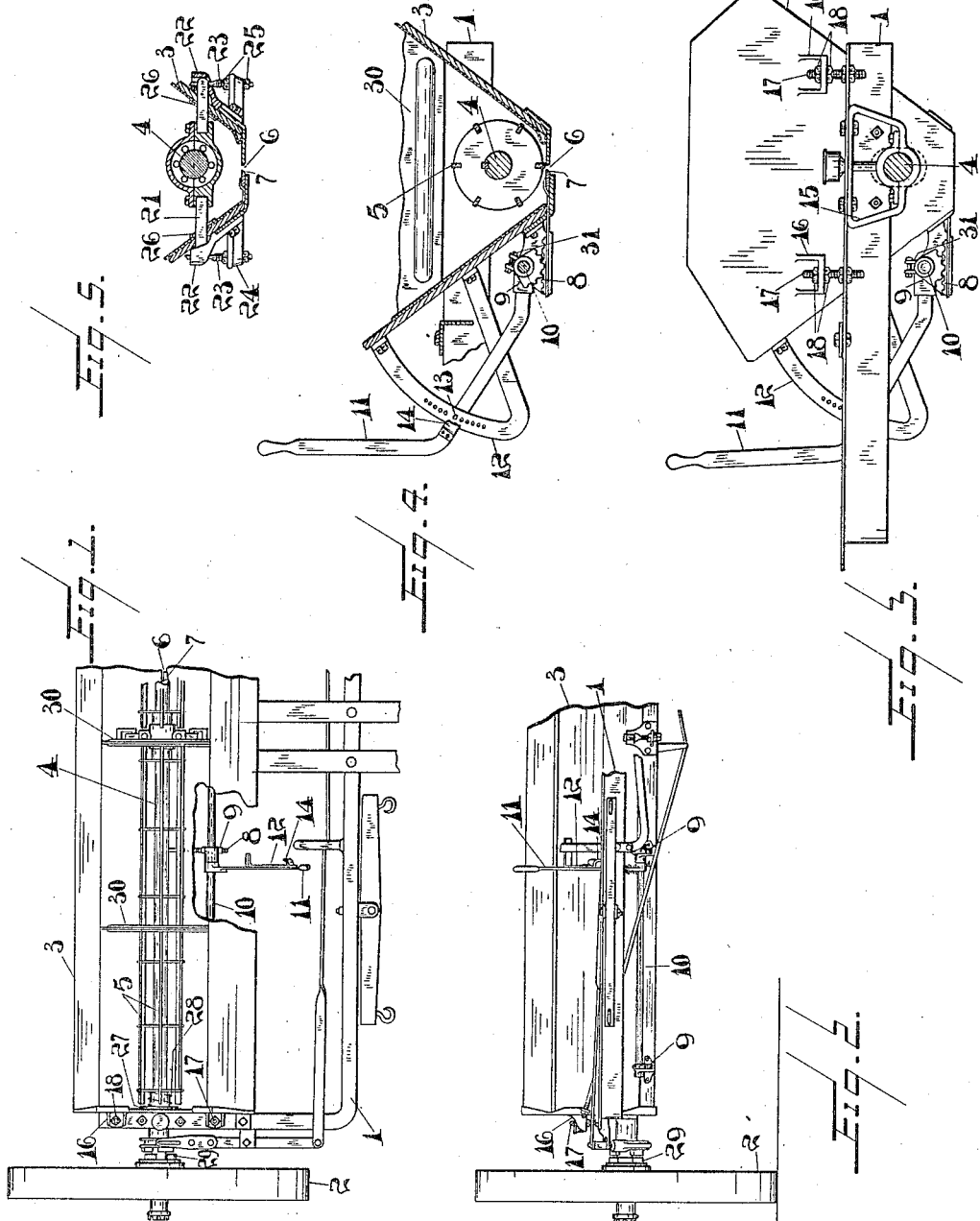

OTTO GEORGE RIESKE, OF TORONTO, ONTARIO, CANADA, ASSIGNOR TO MASSEY-HARRIS COMPANY, LIMITED, OF TORONTO, ONTARIO, CANADA.

FERTILIZER-DISTRIBUTER.

1,179,866.  Specification of Letters Patent.  Patented Apr. 18, 1916.

Application filed June 15, 1915.  Serial No. 34,304.

*To all whom it may concern:*

Be it known that I, OTTO G. RIESKE, of the city of Toronto, in the county of York, Province of Ontario, Canada, a citizen of the United States of America, have invented certain new and useful Improvements in Fertilizer-Distributers, of which the following is a specification.

This invention relates to broadcast fertilizer distributers of the type in which the fertilizer is discharged from the bottom of a long hopper by the movements of a rotary agitator, and my object is to devise simple and easily manufactured constructions whereby the rate of feed may be accurately adjusted and whereby great accuracy of feed for any adjustment may be insured.

I attain my object by means of the constructions hereinafter described and illustrated in the accompanying drawings in which—

Figure 1 is a plan view of part of a distributer constructed in accordance with my invention. Fig. 2 a front elevation of the same partly in section; Fig. 3 an end elevation of part of the same; Fig. 4 a cross section of the hopper and parts connected therewith; and Fig. 5 a cross sectional detail showing the central bearing of the agitator shaft.

In the drawings like numerals of reference indicate corresponding parts in the different figures.

1 is the main frame suitably shaped to support the different parts and carried by the ground wheels 2.

3 is the fertilizer hopper and 4 the shaft of the agitator which passes through the hopper, and forms the axle for the wheels 2. The agitator comprises longitudinal bars 5 parallel to the axis of the shaft and suitably supported to form a skeleton cylindrical drum.

The hopper is supported and the agitator shaft journaled as hereinafter described. It will be noted that the agitator is located closer to the rear of the hopper 3 than to the front side, the direction of rotation being such that the bars 5 at the under side of the agitator move toward the side of the hopper nearest to the agitator. The discharge opening 6 is also located closer to the side of the hopper nearest to the agitator and which may be described as the front side of the hopper. The discharge opening is also preferably located somewhat to the rear of the vertical plane in which the axis of the agitator shaft lies. This positioning of the agitator and the discharge opening I combine with the direction of rotation of the agitator to secure greater regularity of feed.

To regulate the quantity fed I provide the slide 7 adapted to slide on the bottom of the hopper to and from the rearward side of the discharge opening. This slide has the racks 8 secured thereto which extend outside the hopper and with which mesh the pinions 9 on the shaft 10 journaled on the hopper. A hand lever 11 is secured to the shaft by means of which it may be rocked to adjust the slide. This hand lever operates in conjunction with the quadrant 12 having holes formed therein with which a pin 13 on the hand lever may be engaged. By springing the hand lever to one side, the pin is readily disengaged from one hole ready to engage the next hole opposite which it may be moved. A hook 14 secured to the hand lever overlaps the quadrant and serves to prevent the lever being sprung too far. The agitator shaft is journaled at its ends in the bearings 15 secured to the frame 1.

It is important that the position of the agitator to the bottom of the hopper be exactly adjusted to give a predetermined amount of clearance. It is difficult to adjust the agitator shaft, and I overcome the difficulty by vertically adjusting the hopper itself. For this purpose the hopper has the lugs 16 at each end. Screws 17 are secured to the frame 1 and extend through holes in the lugs. The lugs may be adjusted up and down on the screws by means of the nuts 18. The hopper is thus readily adjusted exactly to the agitator.

The agitator shaft being long, it is desirable to support it intermediate its ends. I therefore provide it at the center with roller bearings, the inner race of which is formed by the agitator shaft, while the outer race 20 is carried by the supporting arms 21 which project through the walls of the hopper through the guiding brackets 22. An eye bolt 23 is provided for each bracket extending through the lug 24 thereon, in which lug it is adjustable by means of the nuts 25. By adjusting these nuts the supporting arms may be suitably adjusted to properly position the central bearing to properly aline the shaft. The plate 26 carried by each of the supporting arms serves to prevent fertilizer leaking through the somewhat elongated hole necessarily left in the wall of the hopper for the passage of the arms. Elongated holes are necessarily formed also in the ends of the hopper for the passage of the agitator shaft, and leakage of fertilizer through these holes is prevented by the disks 27 which closely fit the agitator shaft, but are slidable thereon. These disks are maintained in contact with the inner surfaces of the ends of the hopper by means of coil springs 28 which engage the agitator and the disks. It will be noted that the agitator shaft also forms the axle of the machine, the wheels being loose thereon. They may be put into gear with the axle, however, by means of the clutches 29 which may be actuated by any ordinary shifter mechanism, which forms no part of the present invention.

Corrugated division plates 30 are located in the hopper at intervals dividing it transversely. These serve to prevent the fertilizer all running toward one end of the hopper when running on uneven ground on which one end of the hopper may rise higher than the other. These are preferably of corrugated sheet metal as shown. It will be noted that the pinions 9 are clamped on the shaft 10 by clamps 31. This is important as the slide 7 is long and springs readily. Therefore I find it necessary to rotatively adjust the pinions on the shaft to insure exact parallelism of the edges of the slide and hopper forming the discharge slot.

What I claim as my invention is:

1. A fertilizer distributer, the combination of the hopper; a rotary agitator journaled lengthwise of the hopper closer to its rearward side than its forward side, a longitudinal discharge slot being formed in the bottom of the hopper the full length of the hopper and forward of the vertical plane in which the axis of the agitator lies; and an adjustable slide for varying the width of the discharge slot operating from the forward side of the slot, and means for rotating the agitator so that it moves rearwardly at its under side to and from the rear.

2. In a fertilizer distributer, the combination of a hopper with a discharge slot in its bottom; a rotary agitator within the hopper; an agitator shaft extending through the ends of the hopper; journal bearings for said shaft supported on the frame of the apparatus; and means for supporting the hopper on the frame so that it may be vertically adjusted to vary the position of the discharge slot relative to the agitator.

3. In a fertilizer distributer, the combination of a hopper with a discharge slot in its bottom; a rotary agitator within the hopper; an agitator shaft extending through the ends of the hopper; journal bearings for said shaft supported on the frame of the apparatus; means for supporting the hopper on the frame so that it may be vertically adjusted to vary the position of the discharge slot relative to the agitator; a central bearing for the agitator within the hopper; arms carrying the bearing extending through the front and back of the hopper; and adjustable supports for said arms on the outside of the hopper whereby the bearing may be vertically adjusted relative to the discharge slot.

4. In a fertilizer distributer, the combination of a hopper with a discharge slot in its bottom; a rotary agitator within the hopper; an agitator shaft extending through the ends of the hopper; journal bearings for said shaft supported on the frame of the apparatus; means for supporting the hopper on the frame so that it may be vertically adjusted to vary the position of the discharge slot relative to the agitator; and a central bearing for the agitator within the hopper vertically adjustable relative to the hopper.

5. In a fertilizer distributer, the combination of a hopper with a discharge slot in its bottom; a rotary agitator within the hopper; an agitator shaft extending through the ends of the hopper; journal bearings for said shaft supported on the frame of the apparatus; means for supporting the hopper on the frame so that it may be vertically adjusted to vary the position of the discharge slot relative to the agitator; disks fitted on the agitator shaft against the inside of the ends of the hopper; and springs on said agitator shaft tending to press said disks against the ends of the hopper to prevent escape of fertilizer through the openings for the passage of the agitator shaft.

6. In a fertilizer distributer, the combination of the hopper; a rotary agitator journaled lengthwise of the hopper, a discharge slot being formed in the bottom of the hopper lengthwise of the same; a slide for varying the width of the slot; a plurality of racks for moving the slide; a shaft; pinions on said shaft engaging the racks; and means for rotatively adjusting the pinions on the shaft.

Signed at city of Toronto in county of York, this 7th day of June A. D. 1915, in the presence of the two undersigned witnesses.

OTTO GEORGE RIESKE.

Witnesses:
J. J. HOLMES,
J. G. HOSSACK.